United States Patent

Sakaguchi et al.

[11] Patent Number: 5,961,890
[45] Date of Patent: *Oct. 5, 1999

[54] THIRD-ORDER NONLINEAR OPTICAL MATERIAL

[75] Inventors: Toru Sakaguchi; Koji Ohta, both of Ikeda; Akira Nakamura; Kazushi Mashima, both of Toyonaka, all of Japan

[73] Assignee: Agency of Industrial Science & Technology, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/903,065

[22] Filed: Jul. 30, 1997

[30] Foreign Application Priority Data

Aug. 1, 1996 [JP] Japan .................... 8-220494

[51] Int. Cl.$^6$ .................... F21V 9/00; G02F 1/35
[52] U.S. Cl. .................... 252/582; 359/329
[58] Field of Search .................... 252/582, 584, 252/587; 359/329

[56] References Cited

U.S. PATENT DOCUMENTS

| | | | |
|---|---|---|---|
| 5,162,939 | 11/1992 | Herron et al. | 252/582 |
| 5,234,758 | 8/1993 | Olsen et al. | 252/582 |
| 5,290,485 | 3/1994 | Gotoh et al. | 252/582 |
| 5,368,782 | 11/1994 | Gotoh et al. | 252/587 |
| 5,432,635 | 7/1995 | Tanahashi et al. | 252/582 |
| 5,453,220 | 9/1995 | Swager et al. | 252/582 |
| 5,688,442 | 11/1997 | Ando et al. | 359/329 |

OTHER PUBLICATIONS

Mashima et al., J. Am. Chem. Soc., vol. 115, pp. 11632–11633, (1993).
Cayton et al., J. Am. Chem. Soc., vol. 111, pp. 8921–8923, (1989).
Handa et al., Chemistry Letters, pp. 453–456, (1992).

*Primary Examiner*—Philip Tucker
*Attorney, Agent, or Firm*—Nikaido Marmelstein Murray & Oram LLP

[57] ABSTRACT

A third-order nonlinear optical material comprising a complex compound represented by the general formula:

$$A_k B_l (LIG_a)_i (LIG_b)_j \qquad (1)$$

wherein A represents one metallic element selected from the group consisting of Cr, Mo and W; B represents one metal selected from the group consisting of Ni, Pd and Pt; each of $LIG_a$ and $LIG_b$ represents one ligand selected from the group consisting of monodentate and higher ligands; k is an integer of 0 or 1 to 4; l is an integer of 0 or 1 to 4; k+l is 2 or 4; i is an integer of 0 to 18; j is an integer of 0 to 18; and i+j is an integer of 1 to 18; provided that i and i+j are determined depending on the type and number of metals and the types of $LIG_a$ and $LIG_b$.

27 Claims, 1 Drawing Sheet

THIRD-ORDER NONLINEAR OPTICAL MATERIAL

BACKGROUND OF THE INVENTION

The present invention relates to a third-order nonlinear optical material for use in, for example, a fast switch, an optical logical circuit, an optical memory, a phase correction device, a phase conjugate mirror or an image transmission material. In particular, the present invention is concerned with the third-order nonlinear optical material which contains a specified complex compound.

It is known that certain types of materials, e.g., organic compounds exhibit third-order nonlinear optical properties, and these materials are also generally called nonlinear medium. However, such conventional third-order nonlinear optical materials based on organic compounds generally exhibit a high absorption of rays having wavelengths within the visible wavelength range and does not exhibit a high third-order molecular hyperpolarizability, so that the availability thereof as third-order nonlinear optical materials is low. Therefore, there is a strong demand for the development of a practical third-order nonlinear optical material exhibiting high third-order nonlinear optical effect.

SUMMARY OF THE INVENTION

The object of the present invention is to provide a practical third-order nonlinear optical material exhibiting high third-order nonlinear optical effect.

The inventors have conducted extensive studies taking the above current state of the art into account, and have found that a group of complex compounds of a specified structure exhibiting high third-order nonlinear optical effect. That is, according to the present invention, there is provided a third-order nonlinear optical material comprising a complex compound represented by the general formula:

$$A_k B_l (LIG_a)_i (LIG_b)_j \quad (1)$$

wherein A represents one metallic element selected from the group consisting of Cr, Mo and W; B represents one metal selected from the group consisting of Ni, Pd and Pt; each of $LIG_a$ and $LIG_b$ represents one ligand selected from the group consisting of monodentate and higher ligands; k is an integer of 0 or 1 to 4; l is an integer of 0 or 1 to 4; k+l is 2 or 4; i is an integer of 0 to 18; j is an integer of 0 to 18; and i+j is an integer of 1 to 18; provided that i and i+j are determined depending on the type and number of metals and the types of $LIG_a$ and $LIG_b$.

DESCRIPTION OF THE PREFERRED EMBODIMENTS

Figure 1:
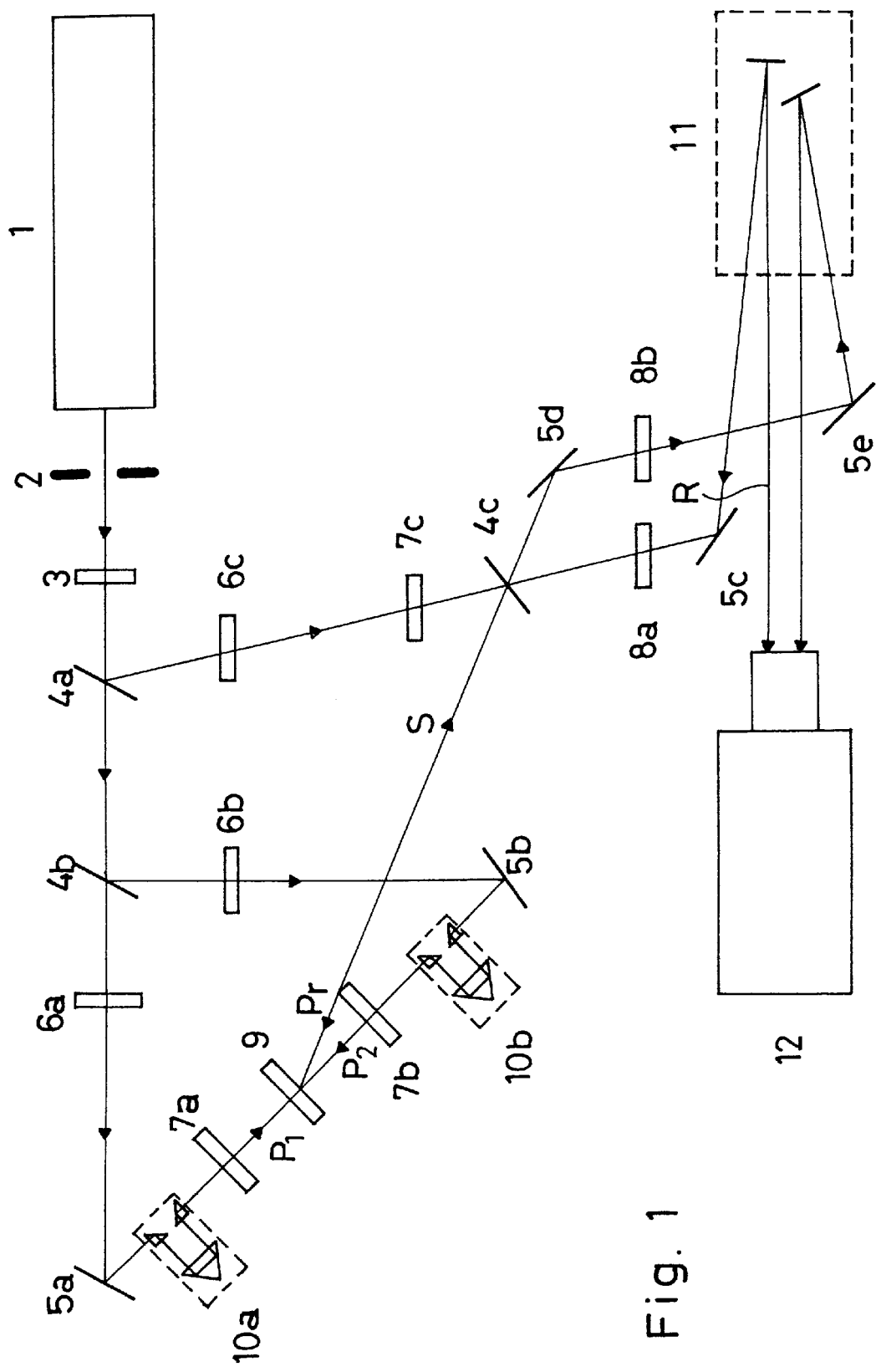
FIG. 1 is a schematic diagram showing the degenerate four-wave mixing optical setup, which is used for the measurement of the third-order molecular hyperpolarizability (in esu) of the complex compound of the present invention.

With respect to the complex compound of the general formula (1) for use in the present invention, the symbols of the formula have the following meanings.

The symbol A represents one metallic element selected from the group consisting of Cr, Mo and W. Of these metallic elements, Mo is preferred.

The symbol B represents one metal selected from the group consisting of Ni, Pd and Pt. Of these metals, Pd and Pt are preferred.

Each of $LIG_a$ and $LIG_b$ represents one ligand selected from the group consisting of monodentate and higher ligands. The terminology "monodentate and higher ligands" used herein collectively means a monodentate ligand and multidentate ligands such as a bidentate ligand, a terdentate ligand and a quadridentate ligand.

Each of the symbols k and l representing the numbers of metal atoms A and B, respectively, is an integer of 0 to 4, and the sum thereof is 2 or 4.

Each of the symbols i and j representing the numbers of ligands $LIG_a$ and $LIG_b$, respectively, is an integer of 0 to 18, and the sum thereof is an integer of 1 to 18, provided that i and i+j are determined depending on the type and number of metals and the types of $LIG_a$ and $LIG_b$.

In the complex compound of the general formula (1), examples of the monodentate and higher ligands represented by $LIG_a$ and $LIG_a$ are as follows.

(1) Examples of the monodentate ligands include a group of the formula $X^-$ (X is a halogen) such as $Cl^-$, $Br^-$ or $I^-$; a group of the formula $R^-$ (R is H, an alkyl represented by the general formula $C_n H_{2n+1}$ (n ranges from 1 to 5), an aromatic ring or a derivative thereof) such as methyl, ethyl or phenyl; a group of the formula $NCS^-$ and group of the formula $NCMe^-$.

(2) Examples of the bidentate ligands include a carboxylate (represented by the general formula $RCOO^-$ wherein R is H, an alkyl represented by the general formula $C_n H_{2n+1}$ (n ranges from 1 to 5), an aromatic ring or a derivative thereof) such as acetate, propionate or benzoate; and an organic compound whose fundamental structure has at its 1- and n-positions (n=3, 4, 5, 6, 7) elements being identical to each other or different from each other and selected among N, O, S and P, these N, O, S and P being crosslinked by an alkyl or a group included in an aromatic ring. Such an organic compound is, for example, $Me_2 PCH_2 PMe_2$ (Me is methyl; this applies hereinbelow), PhN—CH═NPh or a compound of the formula:

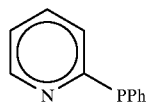

wherein Ph represents a phenyl; this applies hereinbelow,

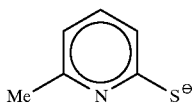

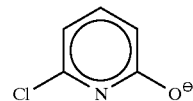

(3) Examples of the terdentate ligands include an organic compound whose fundamental structure has at its 1-, n- and m-positions (n=3, 4, 5, 6, 7; m=n+2, 3, 4, 5, 6) elements being identical to each other or different from each other and selected among N, O, S and P, these N, O, S and P being crosslinked by an alkyl or a group included in an aromatic ring. Such an organic compound is, for example, a compound of the formula:

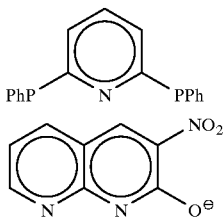

As a group of compounds comprehended in the complex compounds of the general formula (1) for use in the present invention, there can be mentioned those represented by the formula:

$$A_2(pyphos)_4 \quad (1\text{-}1)$$

wherein A is as defined above; and (pyphos) represents 6-diphenylphosphino-2-pyridonate.

The above compound of the formula (1-1) can be synthesized by reacting 4 equivalents of 6-diphenylphosphino-2-pyridone (hereinafter referred to as (pyphosH)) with $A_2(O_2CCH_3)_4$ in a solvent in the presence of chlorine in accordance with the method described in Mashima, K., Nakao, H., Tanaka, H., Nakamura, A.; Chem. Lett., 1992, 453. For example, $Mo_2(pyphos)_4$ wherein A=Mo can be synthesized by reacting 4 equivalents of (pyphosH) with $Mo_2(O_2CCH_3)_4$ in a solvent of dichloromethane in accordance with the following reaction formula:

The preferred base for use in the above reaction is selected from among $NaOCH_3$, NaOH, NaH and $N(C_2H_5)_3$. A preferred reaction solvent is, for example, dichloromethane or tetrahydrofuran (THF).

As another group of compounds comprehended in the complex compounds of the general formula (1) for use in the present invention, there can be mentioned those represented by the formula:

$$A_2B_2X_2(pyphos)_4 \quad (1\text{-}2)$$

wherein A, B, (pyphos) and X are as defined above.

The above complex compound of the formula (1-2) can be synthesized in accordance with the method described in K. Mashima, H. Nakao, A. Nakamura; J.A.C.S., vol. 115, No. 25, p11632 (1993). For example, $Mo_2Pd_2Cl_2(pyphos)_4$ wherein A=Mo, B=Pd and X=Cl can be synthesized by reacting 2 equivalents of $PdCl_2(PhCN)_2$ with $Mo_2(pyphos)_4$ in a solvent as shown in the following reaction formula:

(2)

A solvent that is preferred for use in the reaction of the above formula (2) is, for example, dichloromethane or THF. In this reaction, the reduction can be performed in accordance with the reduction method in which use is made of a reagent having a hydride such as $NaBH_4$ or $CaH_2$, the photoreduction method or the thermal reduction method.

Alternatively, the complex compound of the general formula (1-2) in which A=Mo, B=Pd or Pt and X=Cl, Br or I can be synthesized by mixing 2 equivalents of $BX_2(cod)$ ((cod) is a 1,5-dicyclo-octadiene group) with $Mo_2(pyphos)_4$ in a solvent and allowing the resultant reaction mixture to stand still to thereby obtain $Mo_2B_2X_4(pyphos)_4$ which is a complex compound as an intermediate product and by reducing this $Mo_2B_2X_4(pyphos)_4$. For example, $Mo_2Pd_2Cl_2(pyphos)_4$ in which A=Mo, B=Pd and X=Cl can be synthesized by mixing 2 equivalents of $PdCl_2(cod)$ with $Mo_2(pyphos)_4$ in a solvent and allowing the resultant reaction mixture to stand still to thereby obtain $MO_2Pd_2Cl_4(pyphos)_4$ which is a complex compound as an intermediate product as shown in the following reaction formula (3) and by reducing this $Mo_2Pd_2Cl_4(pyphos)_4$ as shown in the following formula (4):

$$Mo_2(pyphos)_4 + 2PdCl_2(cod)_2 \rightarrow Mo_2Pd_2Cl_4(pyphos)_4 \quad (3)$$

(4)

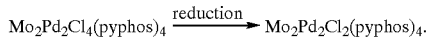

In the reaction of the above formula (3), for example, dichloromethane or THF can be used as the solvent. The reduction of the above complex compound according to the reaction formula (4) can be performed in accordance with the reduction method in which use is made of a hydride having agent such as $NaBH_4$ or $CaH_2$, the photoreduction method or the thermal reduction method.

Preferred examples of the complex compounds of the general formula (1) for use in the present invention include:

(a) a complex compound represented by the general formula (1) wherein A=Mo, k=2, l=0, i=0, $LIG_b$=pyphos and j=4;

(b) a complex compound represented by the general formula (1) wherein A=Mo, k=2, B=Pt, l=2, $LIG_a$=X (X is a halogen selected from the group consisting of F, Cl, Br and I), i=2, $LIG_b$=pyphos and j=4;

(c) a complex compound as a member of the complex compound (b) which is represented by the general formula (1) wherein A=Mo, k=2, B=Pt, l=2, $LIG_a$=Cl, i=2, $LIG_b$=pyphos and j=4;

(d) a complex compound as a member of the complex compound (b) which is represented by the general formula (1) wherein A=Mo, k=2, B=Pt, l=2, $LIG_a$=Br, i=2, $LIG_b$=pyphos and j=4;

(e) a complex compound as a member of the complex compound (b) which is represented by the general formula (1) wherein A=Mo, k=2, B=Pt, l=2, $LIG_a$=I, i=2, $LIG_b$=pyphos and j=4;

(f) a complex compound represented by the general formula (1) wherein A=Mo, k=2, B=Pt, l=2, $LIG_a$=X (X is a halogen selected from the group consisting of F, Cl, Br and I), i=2, $LIG_b$=pyphos and j=4;

(g) a complex compound as a member of the complex compound (f) which is represented by the general formula (1) wherein A=Mo, k=2, B=Pd, l=2, $LIG_a$=Cl, i=2, $LIG_b$=pyphos and j=4;

(h) a complex compound as a member of the complex compound (f) which is represented by the general formula (1) wherein A=Mo, k=2, B=Pd, l=2, $LIG_a$=Br, i=2, $LIG_b$=pyphos and j=4; and (i) a complex compound as a member of the complex compound (f) which is represented by the general formula (1) wherein A=Mo, k=2, B=Pd, l=2, $LIG_a$=I, i=2, $LIG_b$=pyphos and j=4.

In the present invention, the complex compound of the general formula (1) is used as a third-order nonlinear optical material in various forms, for example, in the form of a solution having the complex compound dissolved in a solvent such as benzene, THF or dichloromethane, in the form of a transparent resin such as polymethyl methacrylate, polystyrene or polyvinyl chloride doped with the above complex compound or in a solid form such as a vacuum evaporation coating or a single crystal. In the solution, although the concentration of the complex compound is not particularly limited, it generally ranges from about 0.01 to 0.5% by weight (hereinafter referred to simply as "%").

The type of the solvent is not particularly limited as long as it is capable of dissolving the compounds of the above general formulae (1-1) and (1-2). For example, dichloromethane, benzene, dioxane, THF, chlorobenzene and dimethoxyethane can be used as the solvent.

The degenerate four-wave mixing method (DFWM) having been used for the measurement of the third-order non-linear optical properties (third-order molecular hyperpolarizability γ) of the complex compound for use in the present invention will be described below referring to the appended drawing.

FIG. 1 is a schematic diagram showing a measuring optical system according to the degenerate four-wave mixing method. Linear polarized single light pulse of 523 nm in wavelength and 40 ps in pulse width having been emitted from an Nd:YAG laser 1 passes through a slit 2 and through an IR cut filter 3 and is split by a half mirror 4a into two pulses. The first pulse is further split by a half mirror 4b into two pulses, one of which passes through a λ/2 plate 6a, is totally reflected by a mirror 5a, passes through a variable delay line 10a and reaches a polarizer 7a. Component having been polarized in a direction perpendicular to the surface of the sheet by the polarizer 7a is applied as front pump (FP) light P1 to a specimen 9. For example, the average intensity of FP light P1 is about 70 MW/cm$^2$.

Of the two pulses generated by the splitting at the half mirror 4b, the other passes through a λ/2 plate 6b, is reflected by a mirror 5b, passes through a variable delay line 10b and reaches a polarizer 7b. Component having been polarized in a direction perpendicular to the surface of the sheet by the polarizer 7b is applied as back pump (BP) light P2 to the specimen 9.

Of the two pulses generated by the splitting by means of the half mirror 4a, the other passes through a λ/2 plate 6c and reaches a polarizer 7c. Component having been polarized in a direction perpendicular to the surface of the sheet by the polarizer 7c is again split into two pulses, of which the one is applied as probe light Pr to the specimen 9. Of the two pulses generated by the splitting by means of the half mirror 4c, the other is reduced to 1/1,000,000 in intensity by an ND filter 8a (reduction ratio Fs is variable depending on the type and concentration of the compound), is reflected by a mirror 5c, passes through a fixed delay line 11 and is introduced in a streak camera 12, by which it is detected as reference light R.

In the apparatus shown, the two delay lines 10a and 10b regulate the FP pulse P1, BP pulse P2 and probe pulse Pr so that the arrival times of pulses P1 and P2 are simultaneous with each other relative to the pulse Pr (time lag: not greater than 0.2 ps).

When, in this situation, the specimen 9 is simultaneously irradiated with the FP light P1, BP light P2 and probe light Pr, signal light S is emitted from the specimen 9. This signal light S passes through the half mirror 4c, is reflected by a mirror 5d, is reduced to ½–1/300 by an ND filter 8b (reduction ratio Fr is also variable depending on the type and concentration of the compound), is reflected by a mirror 5e, passes through the fixed delay line 11 and is introduced in the streak camera 12.

In the optical system shown, the pump light P1, pump light P2 and probe light Pr which are incident on the specimen 9 have an intensity ratio of P1:P2:Pr=10:10:1. The intensities of the signal light S and reference light R introduced in the streak camera 12 are expressed as space distribution areas, i.e., as signal light area (As) and probe light area (Ar), respectively, within the streak camera 12.

With respect to some of the complex compounds of the above general formulae (1-1) and (1-2) for use in the present invention, the visible and ultraviolet spectral data thereof in a dichloromethane solution are given in the following Table 1.

TABLE 1

| Complex compound | $\lambda_{max}$ ($\epsilon$, M$^{-1}$ cm$^{-1}$) | |
| --- | --- | --- |
| — | | |
| Mo$_2$(pyphos)$_4$ | 465 (9.0 × 10$^4$) | |
| Mo$_2$Pd$_2$Cl$_2$(pyphos)$_4$ | 458 (1.3 × 10$^4$) | 642 (3.0 × 10$^4$) |
| Mo$_2$Pd$_2$Br$_2$(pyphos)$_4$ | 470 (1.3 × 10$^4$) | 662 (4.7 × 10$^4$) |
| Mo$_2$Pd$_2$I$_2$(pyphos)$_4$ | 489 (5.3 × 10$^3$) | 706 (4.0 × 10$^4$) |
| Mo$_2$Pt$_2$Cl$_2$(pyphos)$_4$ | 409 (1.4 × 10$^4$) | 506 (3.1 × 10$^4$) |
| Mo$_2$Pt$_2$Br$_2$(pyphos)$_4$ | 414 (1.4 × 10$^4$) | 623 (4.7 × 10$^4$) |
| Mo$_2$Pt$_2$I$_2$(pyphos)$_4$ | 418 (1.6 × 10$^4$) | 564 (7.4 × 10$^4$) |

As is apparent from the data of Table 1, the absorption wavelength of the complex compound represented by the general formula (1-2) can be controlled by appropriately selecting the type of the metallic atom and the halogen atom. Thus, the practical value thereof is very high in the use as an optical material.

Working Examples will be described below, so that the feature of the present invention can be made clearer.

EXAMPLE 1

Synthesis of Mo$_2$(pyphos)$_4$ 1.31 g (3.06 mmol) of Mo$_2$(O$_2$CCH$_3$)$_4$, 3.42 g (12.3 mmol) of (pyphosH) and 0.699 g (12.4 mmol) of NaOCH$_3$ were put in a 200 ml glass vessel purged with argon. 150 ml of dichloromethane was added thereto, and the obtained mixture was agitated at room temperature in an argon atmosphere for 2 days. Subsequently, the dichloromethane was distilled off in vacuum, and 0.684 g (12.7 mmol) of NaOCH$_3$ and 150 ml of dichloromethane were again added and agitated for 6 days to complete the reaction. Thereafter, unwanted matter was filtered off, and the crystal contained in the resultant solution was recrystallized from dichloromethane/diethyl ether. Thus, a red crystal of Mo$_2$(pyphos)$_4$ was obtained with a yield of 53%. The analytical data of the product are as follows:

m.p. 140–150° C.; $^1$H NMR (C$_6$D$_6$, 30° C.): δ6.36 (d, 4H), 6.58 (d, 4H), 6.76 (t, 4H), 7.07–7.14 (m, 24H), 7.40–7.46 (m, 16H); $^{31}$P NMR (CDCl$_3$, 30° C.): δ-7.8 (s); FAB-MS for $^{98}$Mo m/z, 1309 (MH$^+$); and elementary analysis, calculated as C$_{68}$H$_{52}$Mo$_2$N$_4$O$_4$Pd$_4$: C 62.59, H 4.02, N 4.28/found: C 61.99, H 4.15, N 4.28.

EXAMPLE 2

Synthesis of Mo$_2$Pd$_2$Cl$_2$(pyphos)$_4$ 216 mg (200 μmol) of Mo$_2$(pyphos)$_4$ and 153 mg (400 μmol) of dichlorobisbenzonitrilepalladium (hereinafter referred to as "PdCl$_2$(PhCN)$_2$") were put in an 80 ml glass vessel purged with argon. 15 ml of dichloromethane was added thereto, and these were reacted in an argon atmosphere for 15 days. Red microcrystals were formed in the reaction system. After the completion of the reaction, the solution portion was removed, and the obtained crystals were dried in vacuum, thereby obtaining Mo$_2$Pd$_2$Cl$_2$ (pyphos)$_4$ with a yield of 63%. The analytical data of the product are as follows:

m.p. 237–243° C.; $^1$H NMR (CDCl$_3$, 30° C.): δ6.03 (d, 4H), 6.25 (d, 4H), 7.2 (dd, 4H), 7.33–7.46 (m, 24H), 7.50–7.57 (m, 16H); $^{31}$P NMR (CDCl$_3$, 30° C.): δ15.7 (s); FAB-MS for $^{98}$Mo$^{106}$Pd m/z, 1521 (MH$^+$—Cl); and elementary analysis, calculated as C$_{68}$H$_{52}$Mo$_2$N$_4$O$_4$P$_4$Pd$_2$(CH$_2$Cl$_2$): C 49.52, H 3.52, N 3.35/ found: C 49.97, H 3.38, N 3.50.

EXAMPLE 3

Synthesis of Mo$_2$Pd$_2$Br$_2$(pyphos)$_4$ (No. 1)

265 mg (203 μmol) of Mo$_2$(pyphos)$_4$ and 193 mg (515 μmol) of dibromo(1,5-cyclooctadiene)palladium (hereinafter referred to as "PdBr$_2$(cod)") were put in an 80 ml glass vessel purged with argon. 20 ml of dichloromethane was added thereto, and the obtained mixture was agitated in an argon atmosphere for 14 hr. Subsequently, the dichloromethane was distilled off in vacuum, thereby obtaining a green powder. This powder was recrystallized from dichloromethane/diethyl ether. Thus, a red crystal of Mo$_2$Pd$_2$Br$_2$(pyphos)$_4$ was obtained with a yield of 63%. The analytical data of the product are as follows:

m.p. not below 300° C.; $^1$H NMR (CDCl$_3$, 30° C.): δ6.06 (d, 4H), 6.22 (d, 4H), 7.16 (d, 4H), 7.34–7.47 (m, 24H), 7.50–7.57 (m, 16H); $^{31}$P NMR (CDCl$_3$, 30° C.): δ15.7 (s); FAB-MS for $^{98}$Mo$^{106}$Pd m/z, 1600 (MH$^+$—Br); and elementary analysis, calculated as C$_{68}$H$_{52}$Mo$_2$N$_4$O$_4$P$_4$Pd$_2$Br$_2$: C 44.45, H 2.85, N 3.05/found: C 44.12, H 3.50, N 2.76.

EXAMPLE 4

Synthesis of Mo$_2$Pd$_2$I$_2$(pyphos)$_4$

A red crystal of Mo$_2$Pd$_2$I$_2$(pyphos)$_4$ was obtained with a yield of 50% in the same manner as in Example 3, except that use was made of 281 mg (281 μmol) of Mo$_2$(pyphos)$_4$ and 286 mg (611 μmol) of diiodo(1,5-cyclooctadiene)palladium (hereinafter referred to as "PdI$_2$(cod)"). The analytical data of the product are as follows:

m.p. not below 300° C.; $^1$H NMR (CDCl$_3$, 30° C.): δ6.00 (d, 4H), 6.17 (d, 4H), 7.14 (t, 4H), 7.33–7.54 (m, 40H); $^{31}$P NMR (CDCl$_3$, 30° C.): δ15.8 (s); and elementary analysis, calculated as C$_{68}$H$_{52}$N$_4$O$_4$P$_4$I$_2$Mo$_2$Pd$_2$(CH$_2$Cl$_2$): C 44.64, H 2.93, N 3.02/found: C 44.35, H 3.15, N 2.91.

EXAMPLE 5

Synthesis of Mo$_2$Pt$_2$Cl$_2$(pyphos)$_4$

A red crystal of Mo$_2$Pt$_2$Cl$_2$(pyphos)$_4$ was obtained with a yield of 40% in the same manner as in Example 3, except that use was made of 371 mg (284 μmol) of Mo$_2$(pyphos)$_4$ and 214 mg (572 μmol) of dichloro(1,5-cyclooctadiene)platinum (hereinafter referred to as "PtCl$_2$(cod)"). The analytical data of the product are as follows:

m.p. not below 300° C.; $^1$H NMR (CDCl$_3$, 30° C.): δ5.77 (d, 4H), 6.21 (m, 4H), 7.15 (m, 4H), 7.34–7.47 (m, 24H), 7.51–7.59 (m, 16H); $^{31}$P NMR (CDCl$_3$, 30° C.): δ27.9 (s, J$_{Pt-P}$=3391 Hz); FAB-MS for $^{98}$Mo$^{195}$Pt m/z, 1699 (MH$^+$—Cl$_2$); and elementary analysis, calculated as C$_{68}$H$_{52}$N$_4$O$_4$P$_4$Mo$_2$Pt$_2$Cl$_2$(CH$_2$Cl$_2$): C 44.77, H 2.94, N 3.03/found: C 45.21, H 2.95, N 3.12.

EXAMPLE 6

Synthesis of Mo$_2$Pt$_2$Br$_2$(pyphos)$_4$

A red crystal of Mo$_2$Pt$_2$Br$_2$(pyphos)$_4$ was obtained with a yield of 28% in the same manner as in Example 3, except that use was made of 288 mg (211 μmol) of Mo$_2$(pyphos)$_4$ and 205 mg (443 μmol) of dibromo(1,5-cyclooctadiene)platinum (hereinafter referred to as "PtBr$_2$(cod)"). The analytical data of the product are as follows:

m.p. not below 300° C.; $^1$H NMR (CDCl$_3$, 30° C.): δ5.79 (d, 4H), 6.17 (m, 4H), 7.15 (m, 4H), 7.34–7.47 (m, 24H), 7.51–7.60 (m, 16H); $^{31}$P NMR (CDCl$_3$, 30° C.): δ27.3 (s, J$_{Pt-P}$=3363 Hz); FAB-MS for $^{98}$Mo$^{195}$Pt m/z, 1699 (MH$^+$—Br$_2$); and elementary analysis, calculated as C$_{68}$H$_{52}$N$_4$O$_4$P$_4$Mo$_2$Pt$_2$Br$_2$(CH$_2$Cl$_2$): C 42.72, H 2.81, N 2.89/found: C 42.18, H 2.81, N 2.89.

EXAMPLE 7

Synthesis of Mo$_2$Pt$_2$I$_2$(pyphos)$_4$ (No. 1)

A red crystal of Mo$_2$Pt$_2$I$_2$(pyphos)$_4$ was obtained with a yield of 33% in the same manner as in Example 3, except that use was made of 165 mg (126 μmol) of Mo$_2$(pyphos)$_4$ and 147 mg (264 μmol) of diiodo(1,5-cyclooctadiene)platinum (hereinafter referred to as "PtI$_2$(cod)"). The analytical data of the product are as follows:

m.p. not below 300° C.; $^1$H NMR (CDCl$_3$, 30° C.): δ5.77 (d, 4H), 6.13 (m, 4H), 7.15 (m, 4H), 7.34–7.47 (m, 24H), 7.51–7.59 (m, 16H); $^{31}$P NMR (CDCl$_3$, 30° C.): δ26.7 (s, J$_{Pt-P}$=3331 Hz); FAB-MS for $^{98}$Mo$^{195}$Pt m/z, 1699 (MH$^+$—I$_2$); and elementary analysis, calculated as C$_{68}$H$_{52}$N$_4$O$_4$P$_4$Mo$_2$Pt$_2$I$_2$(CH$_2$Cl$_2$): C 39.68, H 2.66, N 2.64/found: C 39.48, H 3.15, N 2.45.

EXAMPLE 8

Synthesis of Mo$_2$Pd$_2$Br$_2$(pyphos)$_4$ (No. 2)

20 ml of a dichloromethane solution containing 335 mg (257 μmol) of Mo$_2$(pyphos)$_4$ was put in an 80 ml glass vessel purged with argon. 10 ml of a dichloromethane solution containing 191 mg (257 μmol) of PdBr$_2$(cod) was added thereto, and the obtained mixture was allowed to stand still at −20° C. for one week. Formed Mo$_2$Pd$_2$Br$_4$(pyphos)$_4$ was crystallized, and the solution portion was removed. The obtained crystal was dried in vacuum, thereby obtaining Mo$_2$Pd$_2$Br$_4$(pyphos)$_4$ with a yield of 38%. The analytical data of the product are as follows:

$^1$H NMR (CD$_2$Cl$_2$, 30° C.): δ7.22–7.26 (m, 16H), 7.28–7.33 (m, 24H); $^{31}$P NMR (CDCl$_3$, 30° C.): δ16.5 (s); and elementary analysis, calculated as C$_{68}$H$_{52}$N$_4$O$_4$P$_4$Mo$_2$Pd$_2$Br$_4$(CH$_2$Cl$_2$): C 43.11, H 2.83, N 2.91/found: C 43.16, H 2.82, N 3.06.

2.0 ml of an ethanol solution containing 0.9 mg of (C$_2$H$_5$)$_4$NBH$_4$ was added to 10 ml of a dichloromethane solution containing 4.9 mg of the above Mo$_2$Pd$_2$Br$_4$(pyphos)$_4$ and reacted at room temperature for 4 hr, thereby obtaining the desired Mo$_2$Pd$_2$Br$_2$(pyphos)$_4$ with a yield of 65%.

EXAMPLE 9

Synthesis of Mo$_2$Pt$_2$I$_2$(pyphos)$_4$ (No. 2)

215 mg (156 μmol) of Mo$_2$(pyphos)$_4$ and 186 mg (334 μmol) of PtI$_2$(cod) were put in an 80 ml glass vessel purged with argon. 20 ml of dichloromethane was added thereto and reacted for 7 days. The dichloromethane was distilled off in vacuum. The resultant red powder was placed in a sublimer equipped with a cold finger and heated at 300° C. for 12 hr. Iodine sublimed, and Mo$_2$Pt$_2$I$_2$(pyphos)$_4$ was stoichiometrically obtained on the bottom of the sublimer.

EXAMPLE 10

The third-order nonlinear optical properties (third-order molecular hyperpolarizability γ) of the complex compounds obtained in Examples 1 to 7 were measured.
(1) Measuring apparatus: one shown in FIG. 1 was used.
(2) Measuring specimen: a dichloromethane solution of 0.45 to 0.045 mM in concentration was used.

(3) Method of calculating third-order molecular hyperpolarizability: The intensities of signal light S and reference light R introduced in a streak camera are expressed as signal light area (As) and reference light area (Ar), respectively, which are space distribution areas in the streak camera. The specific intensity (Rm) of light emitted from a measuring specimen solution was expressed as a ratio of quotients obtained by dividing the As and Ar in the streak camera by the ND filter reduction ratios Fs and Fr, respectively, namely:

$$Rm = (AsFr/ArFs)m^{1/2}.$$

The specific intensity of light from each compound (Rc) is calculated by the formula: Rc=Rm−Rd wherein Rd represents the specific intensity of light from dichloromethane only. The nonlinear susceptibility $\chi^{(3)}c$ of each compound was determined by the comparative method on the basis of the above specific light intensity Rc and the nonlinear susceptibility $\chi^{(3)}cs_2$ of carbon disulfide as a standard specimen. The $\chi^{(3)}cs_2$ was assumed at $2.9 \times 10^{-12}$ esu (Mat. Res. Soc. Symp. Proc., Vol. 283, p903, 1993). The third-order molecular hyperpolarizability listed in Table 2 was obtained by dividing this $\chi^{(3)}c$ by the number of molecules per volume and effecting a local electric field correction.

TABLE 2

| Compd. (Ex. No.) | Third-ord. mol. hyperpolarizability (esu) |
|---|---|
| 1 | $6.9 \times 10^{-31}$ |
| 2 | $1.5 \times 10^{-30}$ |
| 3 | $2.2 \times 10^{-30}$ |
| 4 | $3.1 \times 10^{-30}$ |
| 5 | $3.4 \times 10^{-30}$ |
| 6 | $5.2 \times 10^{-30}$ |
| 7 | $4.9 \times 10^{-30}$ |

As apparent from Table 2, the complex compounds (compounds of Example Nos. 1 to 7) for use in the present invention exhibit a third-order molecular hyperpolarizability higher than that of conventional third-order nonlinear optical materials based on organic compounds (whose third-order molecular hyperpolarizability is on the order of $10^{-32}$ esu at the best), so that the third-order nonlinear optical effect of the former is superior to that of the latter.

For reference, Table 3 given below lists the third-order molecular hyperpolarizability of each of the compound $(Mo_2(pyphos)_4)$ of Example 1 and the compound $(Mo_2Pd_2Cl_2(pyphos)_4)$ of Example 2 in comparison with the third-order molecular hyperpolarizability of each of conventional materials having been regarded as exhibiting high third-order nonlinear optical effect (acetylene polymers and helicenes).

TABLE 3

| Compd. | Third-ord. mol. hyperpolarizability (esu) |
|---|---|
| $Mo_2(pyphos)_4$ | $6.9 \times 10^{-31}$ |
| $Mo_2Pd_2Cl_2(pyphos)_4$ | $1.5 \times 10^{-30}$ |
| acetylene polymers | |

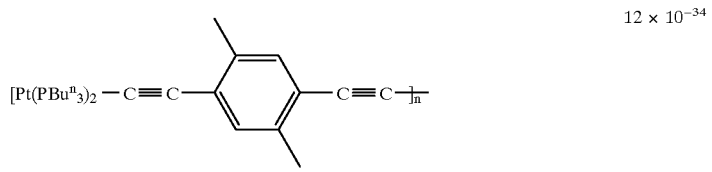

$12 \times 10^{-34}$

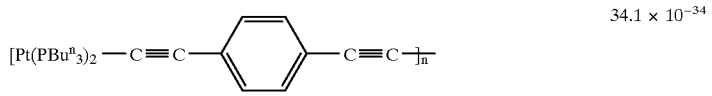

$34.1 \times 10^{-34}$

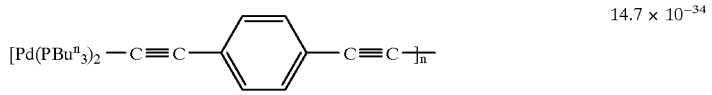

$14.7 \times 10^{-34}$

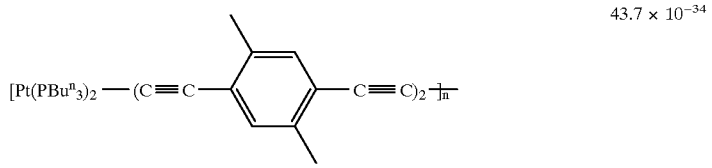

$43.7 \times 10^{-34}$

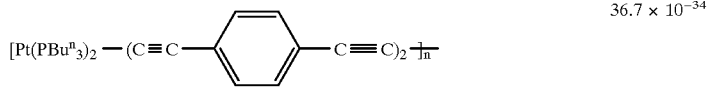

$36.7 \times 10^{-34}$

TABLE 3-continued

| Compd. | Third-ord. mol. hyperpolarizability (esu) |
|---|---|
| helicenes | |
| Thiahetero[7]helicene[a] | $66 \times 10^{-34}$ |
| Thiahetero[5]helicene[b] | $16 \times 10^{-34}$ |

Note:

[a]Thiahetero [7] helicene = 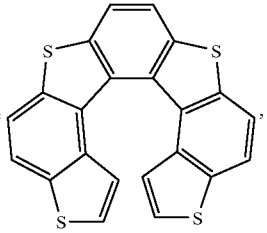,

[b]Thiahetero [5] helicene = 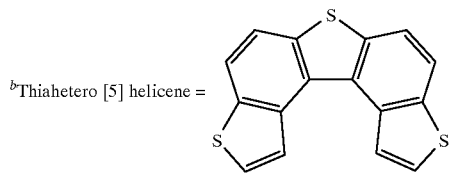

As apparent from the foregoing, the third-order nonlinear optical material of the present invention comprises the complex compound represented by the above general formula (1), so that the present invention enables exerting not only excellent third-order nonlinear optical effect but also the following effects (a) to (e).

(a) The complex compound has high solubility in solvents and high miscibility with resins and other matrix materials, so that a high-performance third-order nonlinear optical material can be obtained.

(b) Light damage is very low.

(c) Medium exchange can be executed even in use.

(d) Excellent resistance is exhibited to intense radiations such as a laser beam.

(e) Accordingly, the third-order nonlinear optical material of the present invention is highly useful, for example, as a fast switch, an optical logical circuit, an optical memory, a phase correction device, a phase conjugate mirror or an image transmission material.

What is claimed is:

1. A third order nonlinear optical device comprising a material comprising a complex compound represented by the general formula:

$$A_k B_l (LIG_a)_i (LIG_b)_j \quad (I)$$

wherein A represents one metallic element selected from the group consisting of Cr, Mo and W; B represents one metal selected from the group consisting of Ni, Pd and Pt; each of $LIG_a$ and $LIG_b$ represents one ligand selected from the group consisting of monodentate, bidentate, terdentate or quadridentate ligands; k is an integer of 0 or 1 to 4; l is an integer of 0 or 1 to 4; k+l is 2 or 4; i is an integer of 0 to 18; j is an integer of 0 to 18; and i+j is an integer of 1 to 18, provided that i and i+j are determined depending on the type and number of metals and the types of $LIG_a$ and $LIG_b$.

2. The device of claim 1, wherein the complex compound is represented by the general formula (1) wherein A=Mo, k=2, l=0, i=0, $LIG_b$=6-diphenylphosphino-2-pyridonate and j=4.

3. The device of claim 1, wherein the complex compound is represented by the general formula (1) wherein A=Mo, k=2, B=Pt, l=2, $LIG_a$=X, wherein X is a halogen selected from the group consisting of F, Cl, Br, and I, i=2, $LIG_b$=6-diphenylphosphino-2-pyridonate and j=4.

4. The device of claim 3, wherein the complex compound is represented by the general formula (1) wherein A=Mo, k=2, B=Pt, l=2, $LIG_a$=Cl, i=2, $LIG_b$=6-diphenylphosphino-2-pyridonate and j=4.

5. The device of claim 3, wherein the complex compound is represented by the general formula (1) wherein A=Mo, k=2, B=Pt, l=2, $LIG_a$=Br, i=2, $LIG_b$=6-diphenylphosphino-2-pyridonate and j=4.

6. The device of claim 3, wherein the complex compound is represented by the general formula (1) wherein A=Mo, k=2, B=Pt, l=2, $LIG_a$=I, i=2, $LIG_b$=6-diphenylphosphino-2-pyridonate and j=4.

7. The device of claim 1, wherein the complex compound is represented by the general formula (1) wherein A=Mo, k=2, B=Pd, l=2, $LIG_a$=X, wherein X is a halogen selected from the group consisting of F, Cl, Br, and I, i=2, $LIG_b$=6-diphenylphosphino-2-pyridonate and j=4.

8. The device of claim 7, wherein the complex compound is represented by the general formula (1) wherein A=Mo, k=2, B=Pd, l=2, $LIG_a$=Cl, i=2, $LIG_b$=6-diphenylphosphino-2-pyridonate and j=4.

9. The device of claim 7, wherein the complex compound is represented by the general formula (1) wherein A=Mo, k=2, B=Pd, l=2, $LIG_a$=Br, i=2, $LIG_b$=6-diphenylphosphino-2-pyridonate and j=4.

10. The device of claim 7, wherein the complex compound is represented by the general formula (1) wherein A=Mo, k=2, B=Pd, l=2, $LIG_a$=I, i=2, $LIG_b$=6-diphenylphosphino-2-pyridonate and j=4.

11. The device of claim 1, further comprising a solvent.

12. The device of claim 11, wherein said complex compound is dissolved in said solvent to attain a concentration of said complex compound of 0.01 to 0.5% by weight.

13. The device of claim 11, wherein said solvent is a member selected from the group consisting of dichloromethane, benzene, tetrahydrofuran, chlorobenzene and dimethoxyethane.

14. The device of claim 1 wherein at least one of $LIG_a$ and $LIG_b$ is monodentate and is selected from the group consisting of: $X^-$ wherein X is a halogen; $R^-$ wherein R is H, an alkyl of $C_nH_{2n+1}$, wherein n is 1 to 5; an aromatic ring which is unsubstituted or substituted with methyl, ethyl or phenyl; $NCS^-$; and $NCMe^-$.

15. The device of 1 wherein at least one of $LIG_a$ and $LIG_b$ is bidentate and is selected from the group consisting of: $RCOO^-$, wherein R is H, an alkyl of $C_nH_{2n+1}$, wherein n is 1 to 5; an aromatic ring which is unsubstituted or substituted with acetate, propionate, or benzoate; and an organic compound whose fundamental structure has at its 1- and n positions (n=3, 4, 5, 6, and 7) elements being identical to each other or different from each other and selected from the group consisting of N, O, S, and P, these N, O, S, and P being crosslinked by an alkyl or a group included in an aromatic ring.

16. The device of claim 1 wherein at least one of $LIG_a$ and $LIG_b$ is terdentate and is an organic compound whose fundamental structure has at its 1-, n- and m- positions (n=3, 4, 5, 6, and 7; m=n+2,3,4,5,6) elements being identical to each other or different from each other and selected from the group consisting of N, O, S, and P, these N, O, S, and P being crosslinked by an alkyl or a group included in an aromatic ring.

17. The device of claim 1 which is selected from the group consisting of a fast switch, an optical logical circuit, an optical memory, a phase correction device, a phase conjugate mirror or an image transmission material.

18. A method of making an optical device having high third order nonlinear optical effects comprising manufacturing the device from a material comprising a complex compound represented by the general formula:

$$A_kB_l(LIG_a)_i(LIG_b)_j \qquad (I)$$

wherein A represents one metallic element selected from the group consisting of Cr, Mo and W; B represents one metal selected from the group consisting of Ni, Pd and Pt; each of $LIG_a$ and $LIG_b$ represents one ligand selected from the group consisting of monodentate, bidentate, terdentate or quadridentate ligands; k is an integer of 0 or 1 to 4; l is an integer of 0 or 1 to 4; k+l is 2 or 4; i is an integer of 0 to 18; j is an integer of 0 to 18; and i+j is an integer of 1 to 18, provided that i and i+j are determined depending on the type and number of metals and the types of $LIG_a$ and $LIG_b$.

19. The method of claim 18 wherein the complex compound is represented by the general formula (1) wherein A=Mo, k=2, l=0, i=0, $LIG_b$=6-diphenylphosphino-2-pyridonate and j=4.

20. The method of claim 18 wherein the complex compound is represented by the general formula (1) wherein A=Mo, k=2, B=Pt, l=2, $LIG_a$=X, wherein X is a halogen selected from the group consisting of F, Cl, Br, and I, i=2, $LIG_b$=6-diphenylphosphino-2-pyridonate and j=4.

21. The method of claim 20 wherein the complex compound is represented by the general formula (1) wherein A=Mo, k=2, B=Pt, l=2, $LIG_a$=Cl, i=2, $LIG_b$=6-diphenylphosphino-2-pyridonate and j=4.

22. The method of claim 20, wherein the complex compound is represented by the general formula (1) wherein A=Mo, k=2, B=Pt, l=2, $LIG_a$=Br, i=2, $LIG_b$=6-diphenylphosphino-2-pyridonate and j=4.

23. The method of claim 20, wherein the complex compound is represented by the general formula (1) wherein A=Mo, k=2, B=Pt, l=2, $LIG_a$=I, i=2, $LIG_b$=6-diphenylphosphino-2-pyridonate and j=4.

24. The method of claim 18, wherein the complex compound is represented by the general formula (1) wherein A=Mo, k=2, B=Pd, l=2, $LIG_a$=X, wherein X is a halogen selected from the group consisting of F, Cl, Br, and I, i=2, $LIG_b$=6-diphenylphosphino-2-pyridonate and j=4.

25. The method of claim 24, wherein the complex compound is represented by the general formula (1) wherein A=Mo, k=2, B=Pd, l=2, $LIG_a$=Cl, i=2, $LIG_b$=6-diphenylphosphino-2-pyridonate and j=4.

26. The method of claim 24, wherein the complex compound is represented by the general formula (1) wherein A=Mo, k=2, B=Pd, l=2, $LIG_a$=Br, i=2, $LIG_b$=6-diphenylphosphino-2-pyridonate and j=4.

27. The method of claim 24, wherein the complex compound is represented by the general formula (1) wherein A=Mo, k=2, B=Pd, l=2, $LIG_a$=I, i=2, $LIG_b$=6-diphenylphosphino-2-pyridonate and j=4.

* * * * *